Feb. 21, 1967  M. E. WALBERG  3,305,027

TWO-WAY PLOW

Filed Sept. 29, 1964  2 Sheets-Sheet 1

Inventor
Maynard E. Walberg
By Kenneth ......
Attorney

United States Patent Office 3,305,027
Patented Feb. 21, 1967

3,305,027
TWO-WAY PLOW
Maynard E. Walberg, Waukesha, Wis., assignor to Allis-Chalmers Manufacturing Company, Milwaukee, Wis.
Filed Sept. 29, 1964, Ser. No. 399,965
6 Claims. (Cl. 172—225)

The present invention relates generally to agricultural implements and more particularly to two-way plows and the like.

In the prior art, the structure used to rotate a two-way plow through 180° has been either gear segments, chain and cable drives or rotary hydraulic actuators. While all of these constructions have afforded workable devices at the same time such constructions have been complicated and costly.

Accordingly an object of the improvement is the provision of a two-way plow having power actuated means for effecting a reversal of the plow with said means deriving power from the tractor. Specifically, it is a feature of the invention to connect a conventional hydraulic two-way ram to an arm intermediate its ends, which arm is slidably supported at one end so as to permit longitudinal movement thereof and is pivotally connected at its opposite end to a crank member which is rigidly associated with the rotatable shaft of the reversible plow structure.

Further objects of the invention will be brought out in the following part of the specification, wherein detailed construction is for the purpose of fully disclosing the invention without placing limitations thereon.

Referring to the accompanying drawings.

Figure 1:
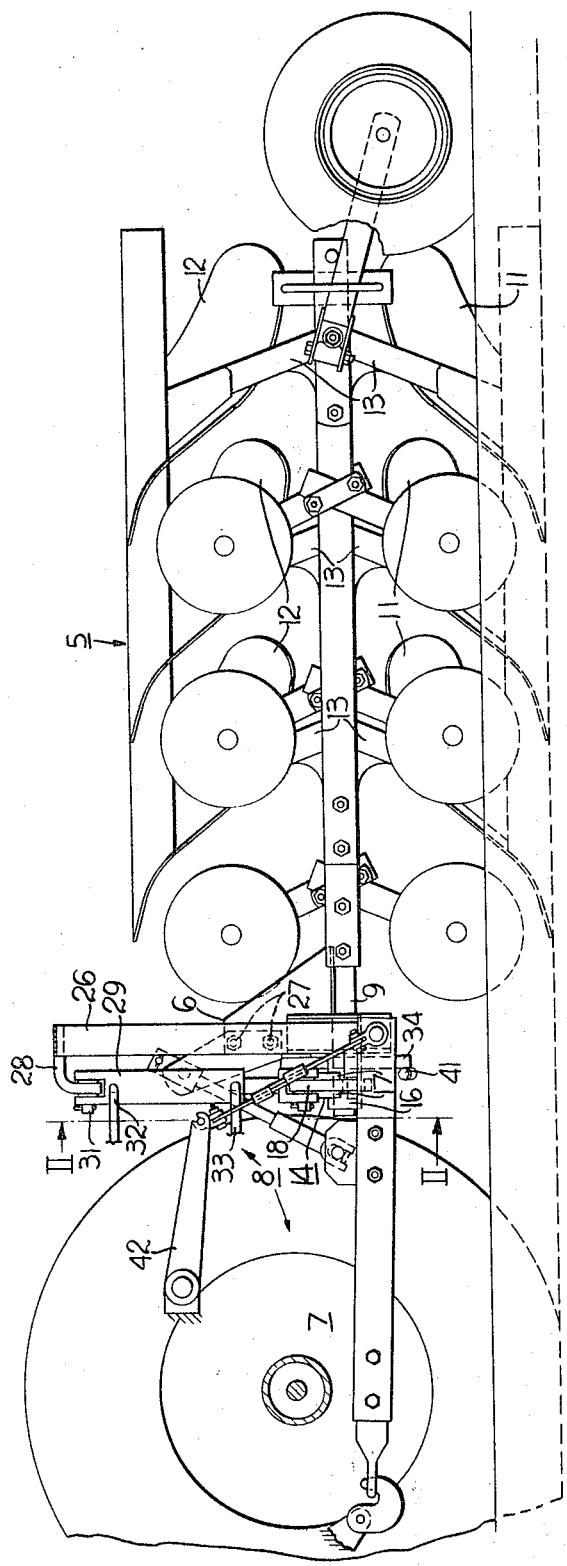
FIG. 1 is a side elevation of a two-way plow attached to a tractor and embodying the features of the present invention.
Figure 2:
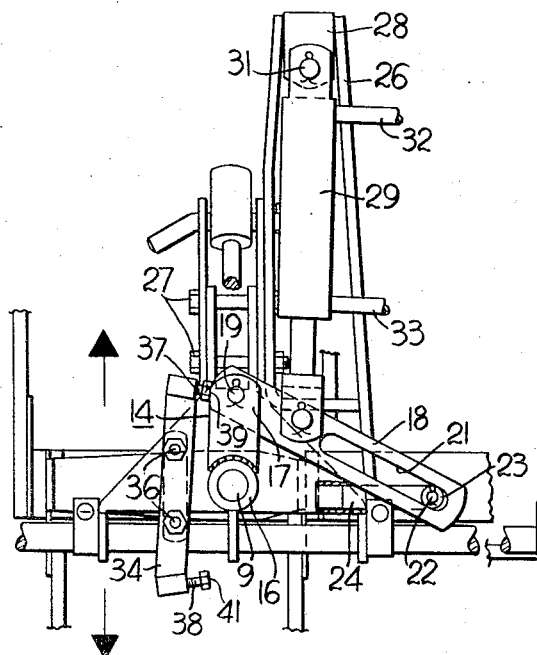
FIGS. 2, 3 and 4 are sectional views taken substantially on line 2—2 of FIG. 1 and operatively illustrating the successive changes in cooperative relationship as a plow is spun from a working position to a transport position and to a non-working position.
Figure 4:
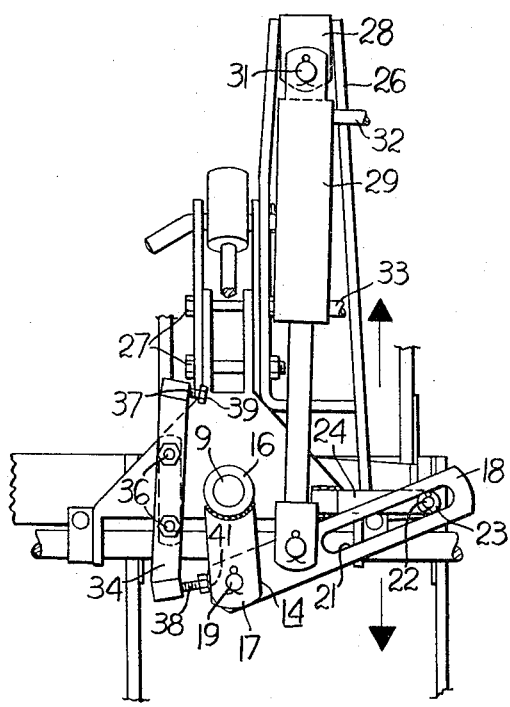

Referring now to FIG. 1, there is provided a two-way plow 5 including an upright A-frame 6 which is connected to a wheel type tractor 7 by the usual single or 3 point hitch. In the illustration shown the hitch 8 is of the 3 point type. The two-way plow 5 includes a fore and aft plow shaft or beam 9 pivotally carried by the A-frame 6 and rotatable about its axis between two operating positions angularly spaced apart a maximum of 180°. FIGS. 1 and 2 show a plow 11 in operating position and FIG. 4 shows plow 11 in non-operating position, the rotation of shaft 9 having placed plow 11 in non-operating position. Plows 11 and 12 are mounted on the plow shaft 9 by means of a frame 13 and the plows are moldboard type, left hand and right hand bottoms 11 and 12, respectively, angularly spaced 180° apart. The forward portion of the plow shaft 9 is journaled in a bearing (not shown) located in A-frame 6. A fabricated crank arm 14 (see FIG. 2) is rigidly secured to the forward end of plow shaft 9 by conventional means such as bolts (not shown) and includes a collar 16 surrounding shaft 9 and including two longitudinally spaced radially extending arms 17 rigidly secured to said collar as by welding. The free ends of the arms 17 are apertured to pivotally receive therebetween a link 18 by means of a pivot pin 19. The opposite end of link 18 is provided with an elongated slot 21 to receive pin 22 and associated roller 23. The pin 22 is fixed to an outwardly extending arm 24 which is rigidly secured to A-frame 6 by suitable means such as welding.

An upright ram anchor tower 26 is rigidly secured to A-frame 6 by suitable means such as bolts 27. The upper end of tower 26 is provided with an integral L-shaped member 28 with the depending leg thereof being apertured to pivotally receive the cylinder end of a hydraulic ram 29 by means of pin 31. Ram 29 is a two-way ram having fluid connections 32 and 33 adapted to be connected with the hydraulic system (not shown) of tractor 7.

An arm 34 rigidly connected to A-frame 6 by means of bolts 36 is provided at its upper and lower ends with stop members 37 and 38, respectively. Stops 37 and 38 are threadedly adjustable to arm 34 and A-frame 6 to vary the angular spacing between the operating positions of the plow. This is commonly known as winging and is concerned with the transverse leveling of the plow in its two operating positions. Stops 37 and 38 are in transverse alignment with the rearward arm 17 of the crank arm 14 thereby forming an adjustable abutment to limit the rotary movement of the plow. It is to be noted that the axes of adjustment of stops 37 and 38 diverge toward pin 23 thereby presenting outer surfaces 39 and 41, respectively which lie substantially parallel to the side of arm 17 when being contacted thereby and thus providing a solid contacting surface. The tractor hydraulic system (not shown) is used to provide hydraulic pressure for holding or maintaining the plow in its operating position and the linkage is so designed that the adjustable stop surface 39 or 41 is always contacted before ram 29 reaches the end of its stroke.

From the foregoing it is seen that the inventive structure is relatively simple involving a minimum of moving parts and thereby presenting a relatively low initial cost along with greater wear life and trouble free service.

The operation of previously described apparatus is as follows.

Assume the plow 5 is positioned as shown in FIG. 1 and you have reached the end of the field and you wish to turn around and start plowing in the opposite direction, the operator would actuate the hydraulic lift arms 42 of the tractor until plow 11 was entirely clear from the ground. At this moment the plow combination would be positioned as shown in FIG. 2. The operator would then actuate the tractor hydraulics to supply fluid pressure to the upper inlet 32 of hydraulic ram 29. This would result in ram 29 acting downwardly on link 18 and crank 14 until the parts were positioned as shown in FIG. 4 with a side surface of arm 17 flushly contacting surface 41. Thus it is seen that plow shaft 9 has been turned through 180°. In this process link 18 has been guided by roller 23 coacting with slot 21 in link 18.

When the operator again wishes to change the positions of the plows, he will actuate the tractor hydraulics to provide hydraulic pressure to inlet 33 of ram 29 while permitting inlet 32 to exhaust to the tractor sump (not shown) and thereby the process described above is reversed.

Figure 3:
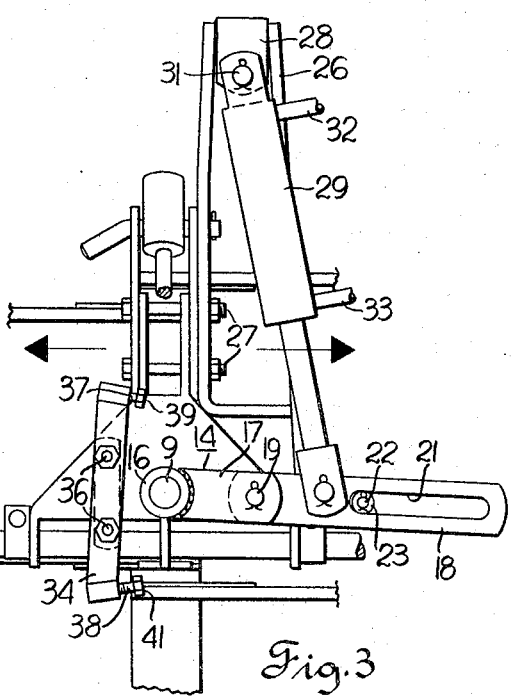

For transport, the plows would be raised to the position shown in FIG. 3 to provide a maximum of ground clearance.

It should be understood that it is not intended to limit the invention to the details of construction herein shown and described and that the invention includes such other forms and modifications as are embraced by the scope of the appended claims.

The embodiments of the invention in which an exclusive property or privilege is claimed are defined as follows:

1. A power actuated two-way plow comprising a frame structure, a plow carrying beam pivotally mounted in said frame for pivotal movement about a generally fore and aft axis, and means for pivoting said beam about said axis for reversing said plows, said means including a crank on said beam, a link pivotally connected at one end to said crank and being provided with a slotted portion adjacent the other end for receiving a guide member carried by said frame, and hydraulic means connected to a mid-portion of said link for actuating said crank.

2. A power actuated two-way plow comprising a frame structure, a plow carrying beam pivotally mounted in said frame for pivotal movement about a generally fore and aft extending axis, and means for pivoting said beam about said axis for reversing said plows, said means including a transversely extending crank on said beam, a hydraulic cylinder pivotally connected at one end to said frame structure, a transversely extending link pivotally connected at one end to said crank and being provided with a slotted portion adjacent the other end for receiving therein a guide roller carried by said frame, the other end of said cylinder being pivotally connected to a mid-portion of said link for actuating said crank.

3. A power actuated two-way plow as recited in claim 1 including means carried by said frame for limiting the pivotal movement of said beam to approximately 180° of movement for reversing said plows.

4. A power actuated two-way plow as recited in claim 3 wherein said limiting means includes a pair of spaced apart adjustable stop members positionable to contact said crank and thereby limit the movement thereof, said stop members being adjustable along axes to provide flush surface contact with said crank.

5. A power actuated two-way plow as recited in claim 2 including means carried by said frame for limiting the pivotal movement of said beam to approximately 180° of movement for reversing said plows.

6. A power actuated two-way plow as recited in claim 5 wherein said limiting means includes a pair of spaced apart adjustable stop members positionable to contact said crank and thereby limit the movement thereof, said stop members being adjustable along non-parallel axes to provide flush surface contact with said crank.

References Cited by the Examiner

UNITED STATES PATENTS

| | | | |
|---|---|---|---|
| 3,175,624 | 3/1965 | Ward | 172—225 |
| 3,196,955 | 7/1965 | Ogle | 172—225 |

ABRAHAM G. STONE, *Primary Examiner.*

J. R. OAKS, *Assistant Examiner.*